US009676245B2

(12) United States Patent
Clemence et al.

(10) Patent No.: US 9,676,245 B2
(45) Date of Patent: Jun. 13, 2017

(54) THREE DOOR STRUCTURE FOR PARTIAL RECIRCULATION IN AN AIR CONDITIONING SYSTEM

(71) Applicant: Denso International America, Inc., Southfield, MI (US)

(72) Inventors: Andrew Clemence, Royal Oak, MI (US); Gregory Thompson, Ortonville, MI (US); Raymond Bailey, South Lyon, MI (US); Melissa Buczek, Orion, MI (US); Simon Hotte, Windsor (CA)

(73) Assignee: Denso International America, Inc., Southfield, MI (US)

( * ) Notice: Subject to any disclaimer, the term of this patent is extended or adjusted under 35 U.S.C. 154(b) by 729 days.

(21) Appl. No.: 14/011,895

(22) Filed: Aug. 28, 2013

(65) Prior Publication Data
US 2014/0065942 A1    Mar. 6, 2014

Related U.S. Application Data

(60) Provisional application No. 61/694,946, filed on Aug. 30, 2012.

(51) Int. Cl.
*B60H 1/00*    (2006.01)
*B60H 1/24*    (2006.01)

(52) U.S. Cl.
CPC ..... *B60H 1/00021* (2013.01); *B60H 1/00028* (2013.01); *B60H 1/24* (2013.01); *B60H 2001/00085* (2013.01)

(58) Field of Classification Search
CPC .......... F24F 3/0522; F24F 13/04; F24F 13/16; F24F 7/007; G05D 23/138;
(Continued)

(56) References Cited

U.S. PATENT DOCUMENTS 5,699,960 A    12/1997   Kato et al.
6,213,198 B1 *    4/2001   Shikata .............. B60H 1/00478
                                                               165/202
(Continued)

FOREIGN PATENT DOCUMENTS

JP       05-069729 A   *   3/1993   ............... B60H 1/00
JP       07-257146       10/1995
(Continued)

OTHER PUBLICATIONS

Search Report and Written Opinion dated Nov. 6, 2013 in corresponding PCT Application No. PCT/US2013/057193 (10 pages).
(Continued)

*Primary Examiner* — Gregory Huson
*Assistant Examiner* — Dana Tighe
(74) *Attorney, Agent, or Firm* — Harness, Dickey & Pierce, P.L.C.

(57) ABSTRACT

A heating, ventilation and air conditioning system includes a blower unit that has a first interior air intake, a second interior air intake and an exterior air intake. Three doors are moved between open and closed positions to define a recirculation mode, a fresh mode and a partial recirculation mode. As the doors move between their open and closed positions, a variable partial mode and a variable fresh mode are defined.

3 Claims, 6 Drawing Sheets

(58) Field of Classification Search
CPC ............ B60H 1/00021; B60H 1/00028; B60H 1/00849; B60H 1/24; B60H 2001/00085
USPC ................ 454/155, 139, 141, 143, 145, 265
See application file for complete search history.

(56) References Cited

U.S. PATENT DOCUMENTS

| | | |
|---|---|---|
| 6,371,202 B1 | 4/2002 | Takano et al. |
| 6,958,009 B2 | 10/2005 | Shindou et al. |
| 7,357,176 B2 | 4/2008 | Yelles |
| 8,002,615 B2 | 8/2011 | Jeong et al. |
| 2002/0025772 A1* | 2/2002 | Egami ................ B60H 1/00849 454/121 |
| 2007/0218824 A1* | 9/2007 | Bailey ................ B60H 1/00564 454/139 |

FOREIGN PATENT DOCUMENTS

| | | |
|---|---|---|
| JP | 2002-087042 A | 3/2002 |
| JP | 2005-067402 A | 3/2005 |
| JP | 2010-100140 A | 5/2010 |
| KR | 10-2006-0071261 | 6/2006 |

OTHER PUBLICATIONS

Japanese Office Action dated Dec. 15, 2015 in corresponding Japanese Patent Application No. 2015-515296 with English translation.

* cited by examiner

THREE DOOR STRUCTURE FOR PARTIAL RECIRCULATION IN AN AIR CONDITIONING SYSTEM

CROSS-REFERENCE TO RELATED APPLICATIONS

This application claims the benefit of U.S. Provisional Application No. 61/694,946, filed on Aug. 30, 2012. The entire disclosure of the above application is incorporated herein by reference.

FIELD

The present disclosure relates to a vehicle Heating Ventilation and Air Conditioning (HVAC) system. More particularly, the present disclosure relates to a three door structure for partial recirculation in the HVAC system.

BACKGROUND

This section provides background information related to the present disclosure which is not necessarily prior art.

Vehicles are known to incorporate HVAC systems to improve the comfort of the people within the passenger compartment of the vehicle. The HVAC systems heat and cool air blown through the HVAC system using a heating heat exchanger and/or a cooling heat exchanger. The heating heat exchanger typically utilizes the engine coolant as a source of heat for heating the air. The cooling heat exchanger is typically an evaporator which is part of an air conditioning system in the vehicle powered by the engine of the vehicle. The air blown through the HVAC system comes from air outside the vehicle, air inside the passenger compartment of the vehicle or a combination of the air outside the vehicle and the air inside the passenger compartment of the vehicle. The air being blown through the HVAC system is conditioned (heated/cooled) and is then directed into the passenger compartment of the vehicle through one or more outlet vents.

Although these vehicle HVAC systems have worked for their intended purposes, some disadvantages remain. For instance, these HVAC systems typically include an exterior air intake vent through which air from outside the vehicle enters the HVAC system. These HVAC systems also typically include an interior air intake vent through which air from inside the vehicle enters the HVAC system. In the "mixture" configuration where air from the exterior air intake vent and air from the interior air intake vent are mixed, both the exterior air intake vent and the interior air intake vent are open.

One disadvantage of the typical air intake systems of the present day is the packaging size required for the dual intake system for air from outside the vehicle and air from inside the vehicle. In addition, these present day systems typically only allow for three specific control or intake modes. These three modes are fresh mode where only air from outside the vehicle is used, partial recirculation mode where both air from outside the vehicle and air from inside the vehicle is used and recirculation mode where only air from inside the vehicle is used. During the partial recirculation mode where both air from outside the vehicle and air from inside the vehicle is used, there is a problem with air from the outside of the vehicle being able to enter the passenger compartment by bypassing the HVAC system.

SUMMARY

This section provides a general summary of the disclosure, and is not a comprehensive disclosure of its full scope or all of its features.

The present disclosure provides a solution to the disadvantages described above, specifically the bypass disadvantage. The present disclosure utilizes three doors to counter these disadvantages. The three doors allow for the partial recirculation mode function in a smaller packaging footprint. In addition, the three doors provide not only the fresh mode, the partial recirculation mode and the recirculation mode, the three door concept also provides a RAM air control which is a variable fresh concept which maintains the airflow amount as vehicle speed increases and a variable partial recirculation mode.

In utilizing the three doors along with the associated linkage design, the disclosure can allow the use of multiple modes including the fresh mode, the partial recirculation mode, the recirculation mode with the added function of RAM air control. RAM air control allows an increased user's option range while the doors move from the fresh mode to an off position. The three door system allows the user to control the fresh and recirculation amount while preventing fresh air from bypassing the blower and thus the entire HVAC system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
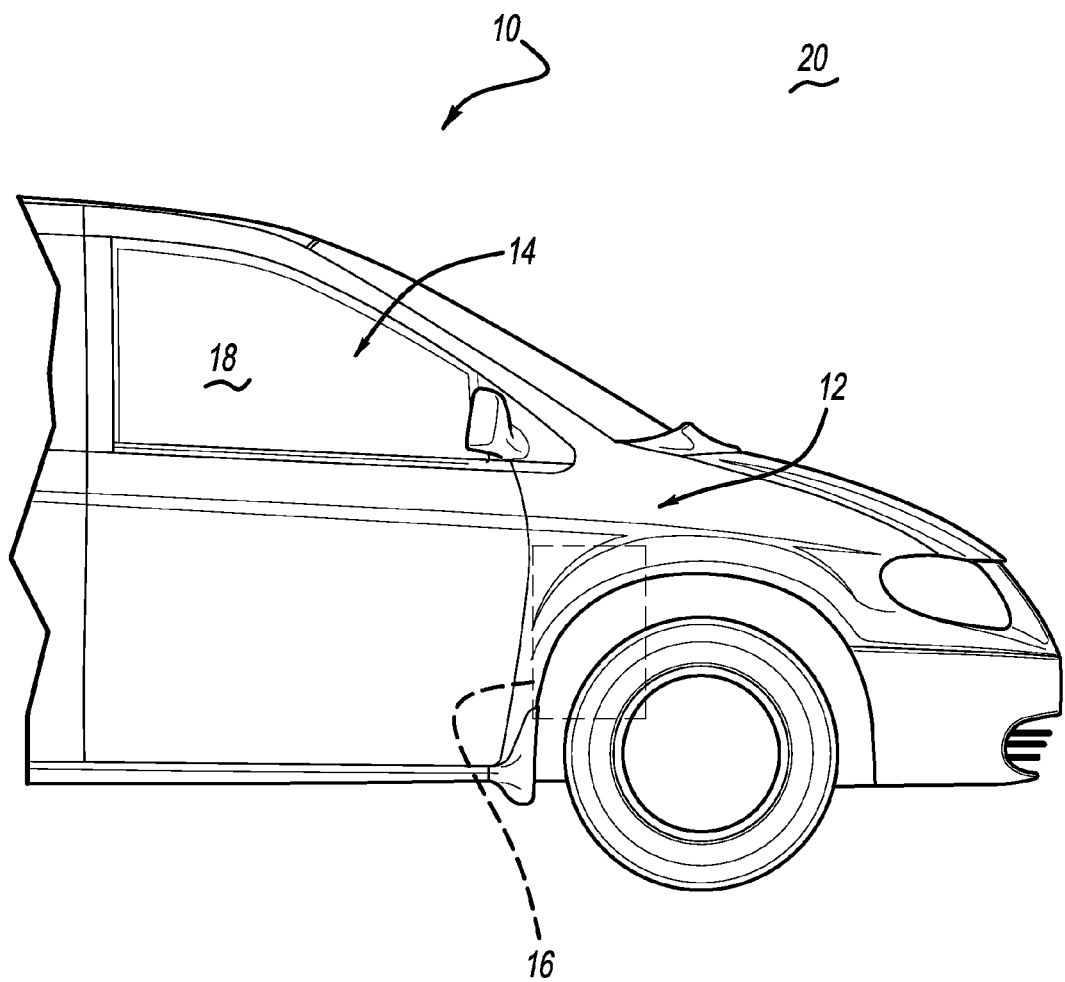
FIG. 1 is a side view of a vehicle with an HVAC system schematically illustrated therein.

The following description is merely exemplary in nature and is not intended to limit the present disclosure, application, or uses. It should be understood that throughout the drawings, corresponding reference numerals indicate like or corresponding parts and features.

Referring initially to FIG. 1, a vehicle 10 is illustrated. The vehicle 10 includes an engine compartment generally indicated at 12. The vehicle 10 also includes a passenger compartment 14. A heating, venting, and air conditioning (HVAC) unit 16 is included within the passenger compartment 14 as schematically illustrated in FIG. 1. The passenger compartment 14 defines an interior space 18 within the passenger compartment 14 and an exterior space 20 outside the passenger compartment 14. The HVAC unit 16 heats and/or cools air within the interior space 18 of the passenger compartment 14 in a known manner.

Figure 2:
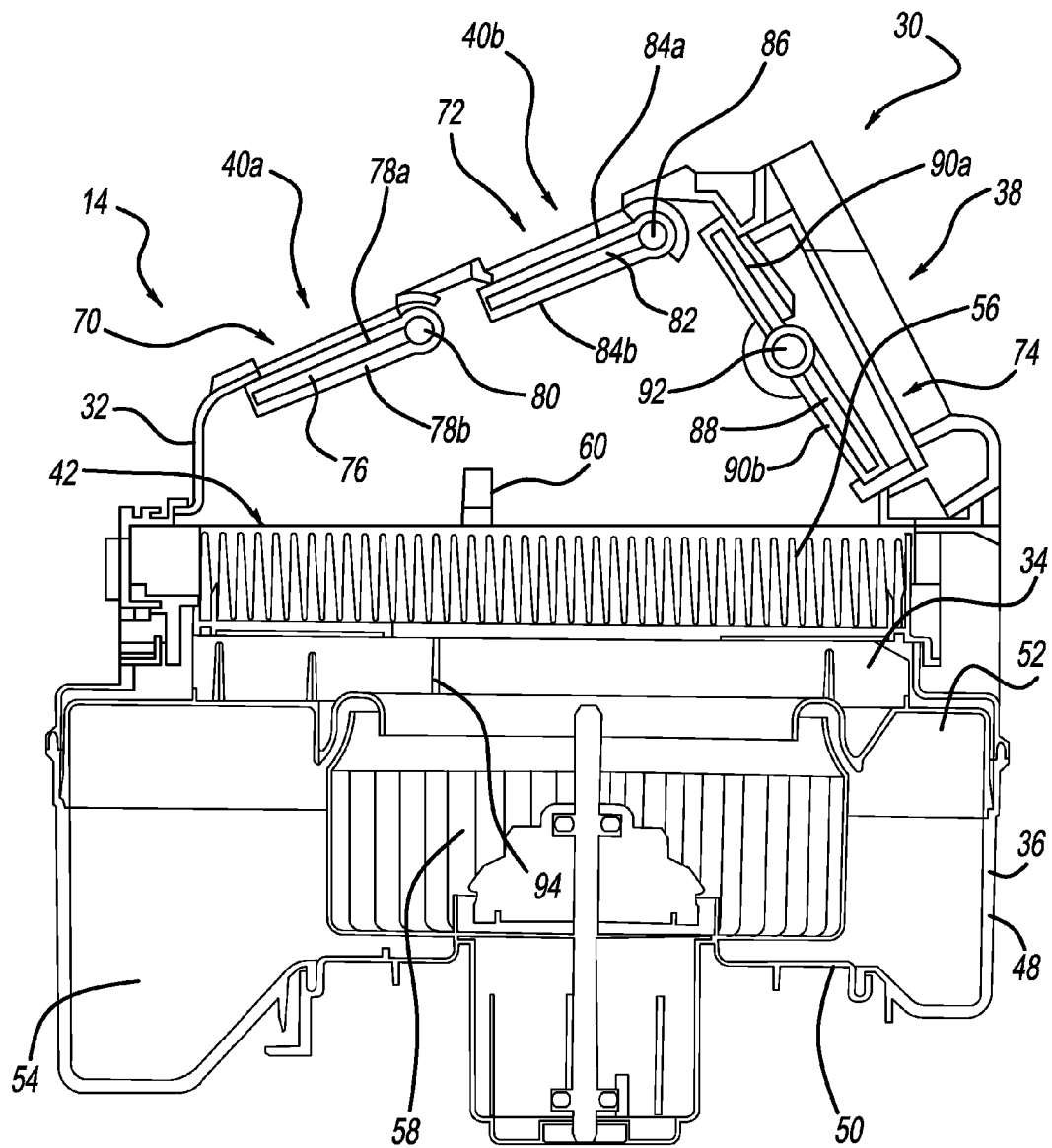
FIG. 2 is a sectional view of a blower unit of the HVAC system of FIG. 1.
Figure 3:
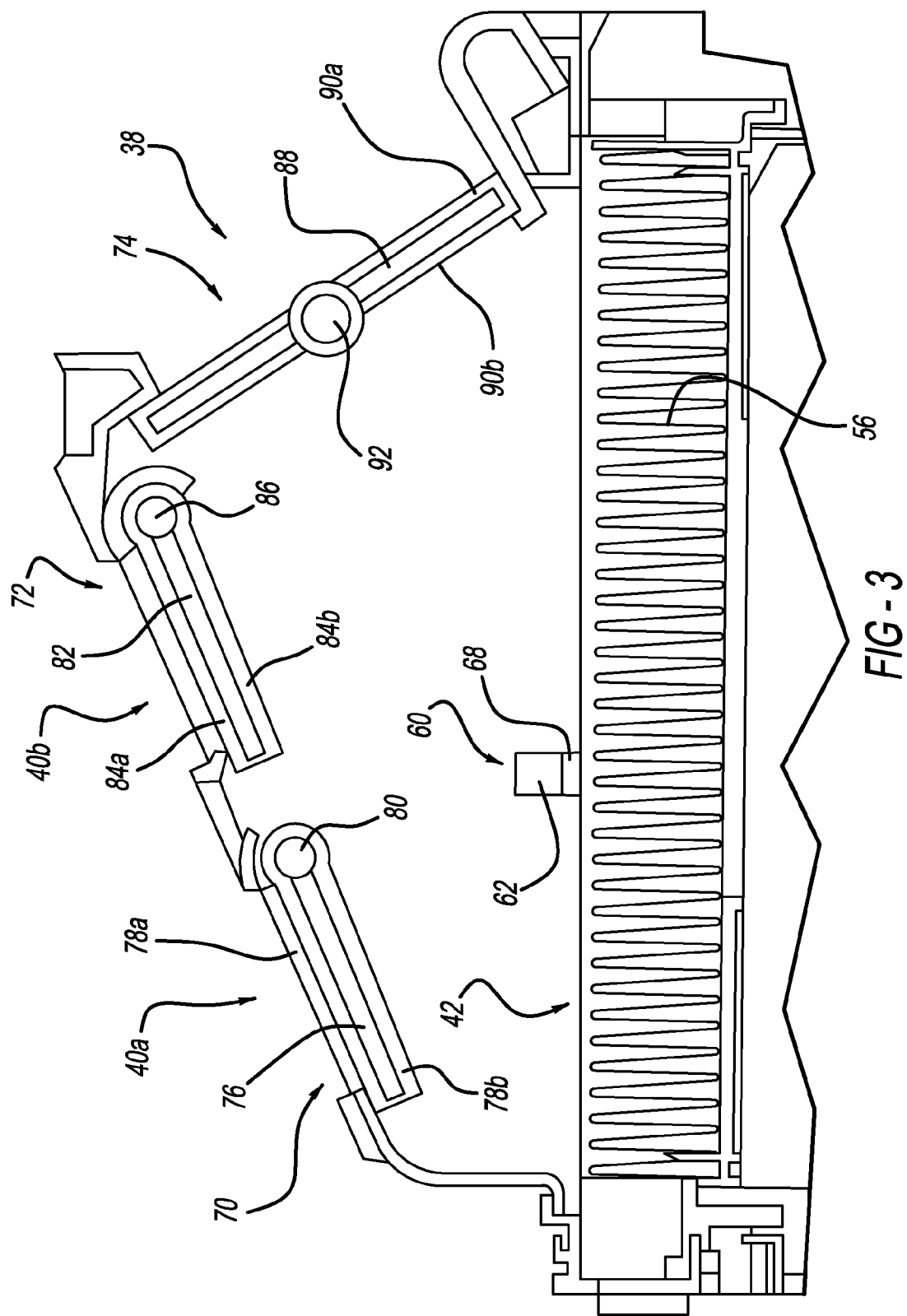
FIG. 3 is a sectional view of the blower unit of the HVAC system of FIG. 2.
Figure 4:
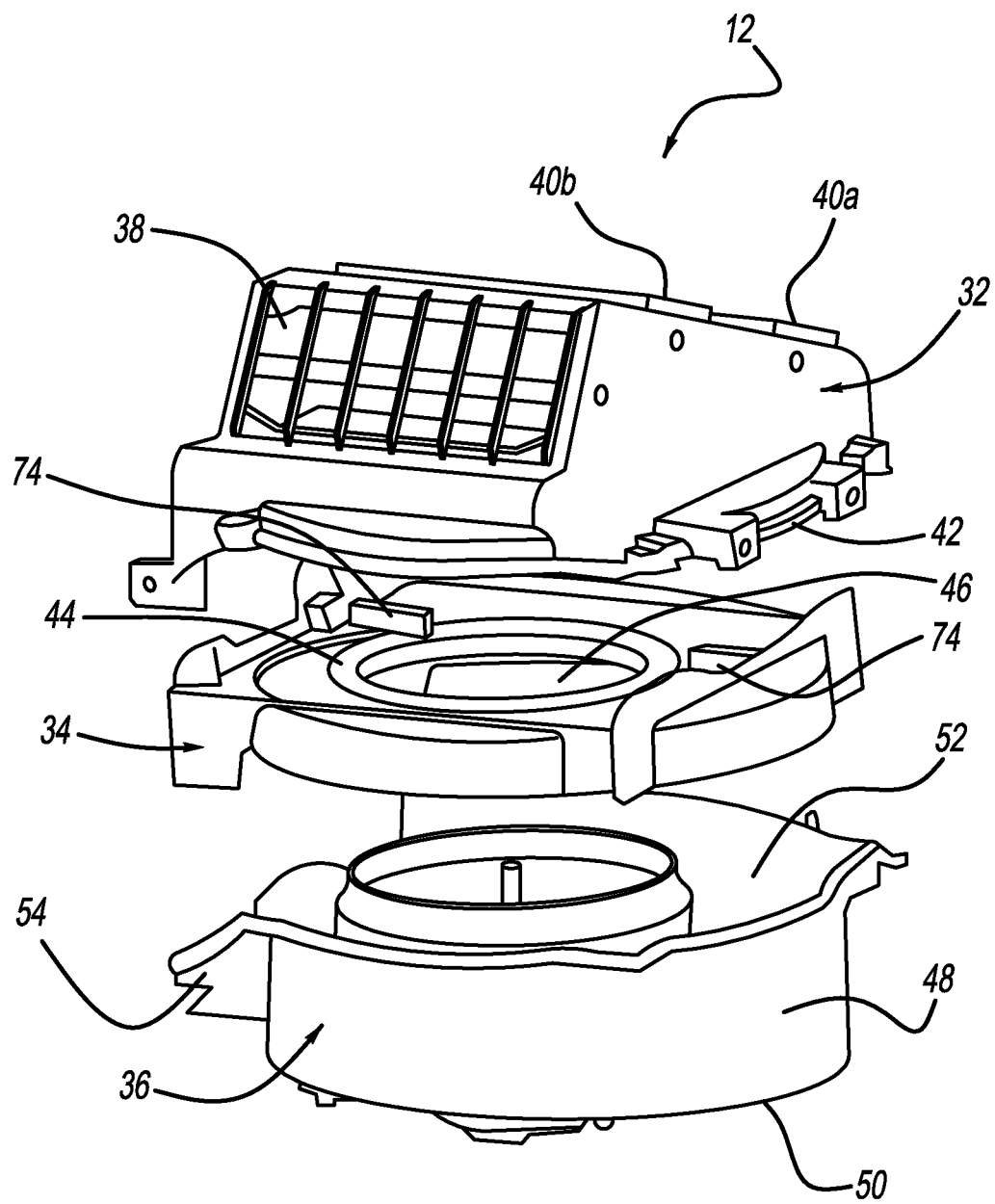
FIG. 4 is an exploded view of the blower unit of the HVAC system of FIG. 2.

Referring now to FIGS. 2, 3 and 4, a blower unit 30 of the HVAC unit 16 is illustrated. In general, the blower unit 30 draws in air from the interior space 18 and/or the exterior space 20, and the blower unit 30 moves the air through a heating heat exchanger (not shown) and/or a cooling heat exchanger (not shown) such that the air can be heated and/or cooled as is well known in the art. Once the air is heated/cooled, the air moves into the interior space 18 for the comfort of the passengers. FIG. 2 illustrates the blower unit 30 in an off mode.

As shown in FIGS. 2 and 4, the blower unit 30 generally includes an upper case member 32, a bellmouth member 34, and a lower case member 36. The bellmouth member 34 is disposed between and coupled to the upper case member 32 and the lower case member 36. The upper case member 32, bellmouth member 34, and lower case member 36 can be coupled in any suitable manner. In one embodiment, the upper case member 32, the bellmouth member 34, and the lower case member 36 are each made out of a rigid plastic material. Also, in one embodiment, the upper case member 32, the bellmouth member 34, and the lower case member 36 are manufactured individually by molding processes.

The upper case member 32 is generally hollow and defines an exterior air intake aperture 38 as shown in FIGS. 2 and 4. The exterior air intake aperture 38 is in fluid communication with the exterior space 20 outside the vehicle 10. As such, air from the exterior space 20 is able to enter the blower unit 30 through the exterior air intake aperture 38. The upper case member 32 also defines a first interior air intake aperture 40a and a second interior air intake aperture 40b. The interior air intake apertures 40a, 40b are in fluid communication with the interior space 18 of the passenger compartment 14 of the vehicle 10. As such, air within the interior space 18 is able to enter the blower unit 30 through the interior air intake apertures 40a, 40b. The upper case member 32 further includes a lower opening 42. The lower opening 42 is in fluid communication with the bellmouth member 34.

The bellmouth member 34 is generally flat and ring-shaped as shown in FIG. 4. The bellmouth member 34 includes an upper surface 44, and the bellmouth member 34 also defines a central aperture 46.

The lower case member 36 generally includes an outer wall 48 and a lower wall 50. The outer wall 48 defines an open top end 52, and the bellmouth member 34 substantially covers the top end 52 of the lower case member 36. The lower case member 36 also includes an exhaust chamber 54. The exhaust chamber 54 is in fluid communication with a heating heat exchanger (not shown) and/or a cooling heat exchanger (not shown). As such, air through the blower unit 30 can exit the blower unit 30 through the exhaust chamber 54 to be heated and/or cooled.

As shown in FIGS. 2 and 3, the blower unit 30 also includes a filter 56. The filter 56 is supported by the upper case member 32 adjacent the lower opening 42 and substantially covers the lower opening 42. As such, dust and any other particulate matter is filtered out of the air as it passes from the upper case member 32 to the bellmouth member 34.

The blower unit 30 further includes a fan 58. The fan 58 can be of any suitable type. In the embodiment shown in FIGS. 2 and 4, the fan 58 is disposed within the lower case member 36. The fan 58 is operable to draw air into the blower unit 30 through the exterior air intake aperture 38 and/or the interior air intake apertures 40a, 40b.

More specifically, operation of the fan 58 can cause air to enter the blower unit 30 through the exterior air intake aperture 38 and/or the interior air intake apertures 40a, 40b. That air then moves through the filter 56, and any particulate matter is filtered out. Next, the air moves through the lower opening 42 of the upper case member 32 and then through the central aperture 46 of the bellmouth member 34. The fan 58 draws the air into the lower case member 36, and then the fan 58 pushes the air out the exhaust chamber 54 toward the heating heat exchanger or the cooling heat exchanger (not shown).

The blower unit 30 further includes a sealing member 60 as shown in FIGS. 2 and 3. The sealing member 60 includes a main body portion 62, which is generally thin and flat and axially straight. The main body portion 62 is disposed within the upper case member 32 near the lower opening 42. The main body portion 62 is integrally attached at both ends to the upper case member 32 in one embodiment. Also, in the embodiment shown, the main body portion 62 is oriented generally perpendicular to the upper surface 44 of the bellmouth member 34. Furthermore, in one embodiment, the main body portion 62 is made out of a hard plastic and is integrally attached through a molding process. As shown in FIGS. 2 and 3, the sealing member 60 further includes a compressible member 68. The compressible member 68 is made out of a compressible material, such as foam. The compressible member 68 is located between the main body portion 62 and the filter 56. As shown, a portion of the compressible member 68 compresses due to the abutment of the filter 56 to thereby create a seal between the sealing member 60 and the filter 56. As such, air is unlikely to pass between the sealing member 60 and the filter 56.

As shown in FIG. 2, the blower unit 30 further includes a first door 70, a second door 72 and a third door 74. In the embodiment shown, while the first, second and third doors 70, 72, 74 are each generally flat and axially straight and rotate around a pivot point of the door, the disclosure is not limited to this style of data and any type of door known in the art may function in the disclosed HVAC system. The first door 70 includes a core member 76 and a compressible member 78a, 78b, coupled on opposite sides of the core member 76. In one embodiment, the core member 76 is made of a hard plastic, and the compressible members 78a, 78b are made out of foam. The first door 70 is movably coupled to the upper case member 32. In the embodiment shown, for instance, the first door 70 is pivotally coupled to the upper case member 32 by at least one pin 80 disposed at one end of the first door 70. Thus, as shown in FIG. 2, the first door 70 is able to pivot about the pin 80 to open and close the first interior air intake aperture 40a.

The second door 72 is largely similar to the first door 70. More specifically, the second door 72 includes a core member 82 made out of hard plastic and collapsible members 84a, 84b made out of foam and coupled to the core member 82 on opposite sides. Also, the second door 72 is movably coupled to the upper case member 32. More specifically, the second door 72 is pivotally attached to the upper case member 32 by at least one pin 86 disposed at one end of the second door 72. Thus, the second door 72 is able to pivot about the pin 86 to open and close the second interior air intake aperture 40b.

The third door 74 is largely similar to the first and second doors 70, 72. More specifically, the third door 74 includes a core member 88 made out of hard plastic and collapsible members 90a, 90b made out of foam and coupled to the core member 88 on opposite sides. Also, the third door 74 is movably coupled to the upper case member 32. More specifically, the third door 74 is pivotably attached to the upper case member 32 by at least one pin 92 disposed at a center of the door. This type of door is referred to as a "butterfly" door. Thus, the third door 74 is able to pivot about the pin 92 to open and close the exterior air intake aperture 38.

The first, second and third doors 70, 72, 74 can move independent of each other. The first, second and third doors 70, 72, 74 can be actuated about the respective pins 80, 86, 92 in any suitable manner, such as by using one or more motors. A linkage system may be incorporated to pivot one or more of the first, second and third doors 70, 72, 74.

Figure 5:
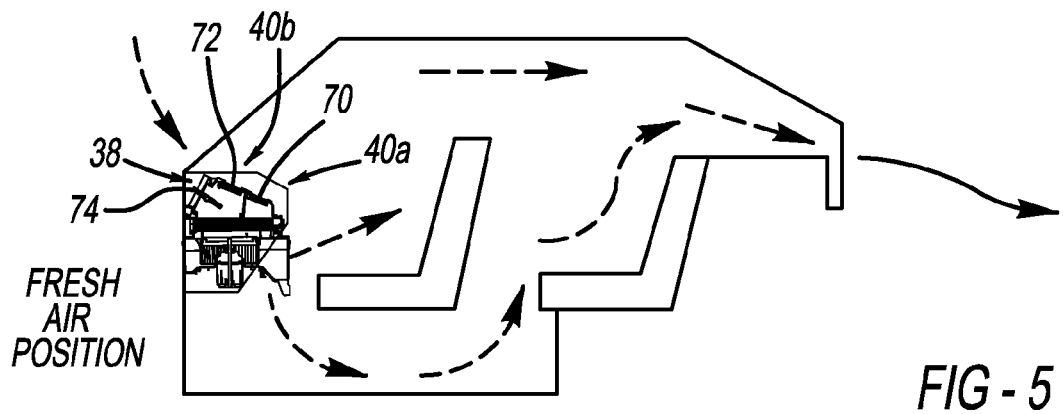
FIG. 5 is a schematic view of a passenger compartment of a vehicle and the blower unit of the HVAC system of FIG. 2 shown in a "FRESH AIR" position.
Figure 6:
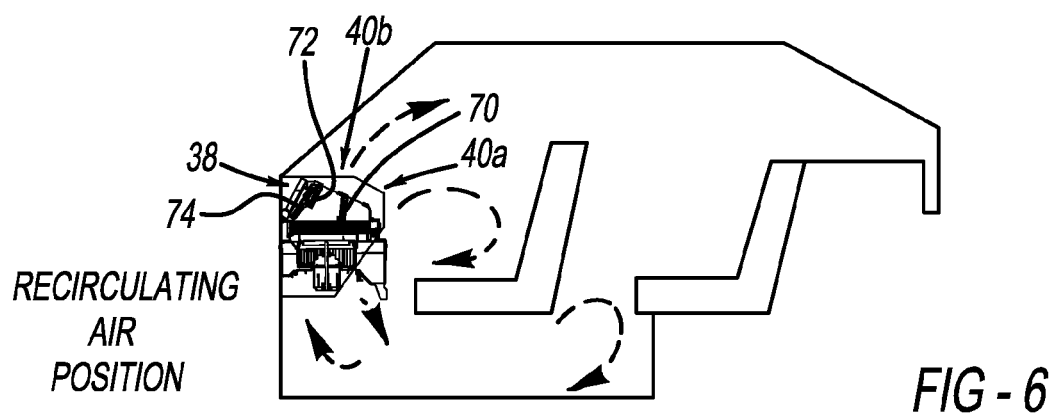
FIG. 6 is a schematic view of a passenger compartment of a vehicle and the blower unit of the HVAC system of FIG. 2 shown in a "RECIRCULATING AIR" position.
Figure 7:
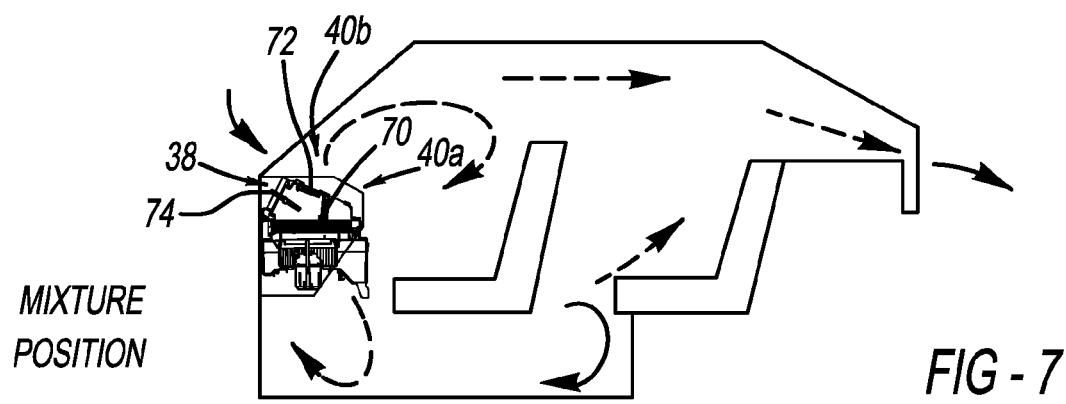
FIG. 7 is a schematic view of a passenger compartment of a vehicle and the blower unit of the HVAC system of FIG. 2 shown in a "MIXTURE" position.

The first, second and third doors 70, 72, 74 can be moved between a fresh air position (FIG. 5), a recirculating air position (FIG. 6), and a mixture position (FIG. 7). In the fresh air position, the first door 70 obstructs the first interior air intake aperture 40a and the second door 72 fully obstructs the second interior air intake aperture 40b. More specifically, the first door 70 is disposed against the upper case member 32 such that the first compressible member 78a deforms to create seal at the periphery of the first interior air intake aperture 40a. In addition, the second door 72 is disposed against the upper case member 32 such that the compressible member 84a deforms to create a seal at the periphery of the second interior air intake aperture 40b. The third door 74 is disposed in a central region of exterior air intake aperture 38 to fully open exterior air intake aperture 38. As such, air is able to enter the blower unit 30 through the exterior air intake aperture 38, and air is unlikely to enter the blower unit 30 through the interior air intake apertures 40a, 40b. More specifically, air is able to enter the blower unit 30 through the exterior air intake aperture 38 and flow on both sides of the third door 74, through the filter 56, through the bellmouth member 34, through the lower case member 36, and out of the blower unit 30 through the exhaust chamber 54. In this manner, the exterior air introduced into the interior of the vehicle 10 will be fresh, and thus enjoyable for passenger breathing comfort.

When the first, second and third doors 70, 72, 74 are in the recirculating air position (FIG. 6), the third door 74 is sealed against the upper case member 32 to fully obstruct the exterior air intake aperture 38. More specifically, the third door 74 abuts against the upper case member 32, which deforms the compressible members 90a, 90b of the third door 74 to thereby create seals with upper case member 32 at the periphery of the exterior air intake aperture 38. In addition, the first door 70 is disposed against the sealing member 60 to fully open the first interior air intake aperture 40a and the second door 72 is disposed immediately adjacent the third door 74 to fully open the second interior air intake aperture 40b. As such, when the first, second and third doors 70, 72, 74 are in the recirculating air position, air is able to enter the blower unit 30 through the interior air intake apertures 40a, 40b, flow through the filter 56, through the bellmouth and lower case members 34, 36, and out of the blower unit 30 through the exhaust chamber 54. It will be appreciated that when the first, second and third doors 70, 72, 74 are in the recirculating air position, the HVAC unit 16 can operate more efficiently to thereby conserve fuel.

When the first, second and third doors 70, 72, 74 are in the mixture position (FIG. 7), the second door 72 fully obstructs the second interior air intake aperture 40b, and the first door 70 is sealed against the sealing member 60 to fully open the first interior air intake aperture 40a. More specifically, the first door 70 abuts against the sealing member 60, which deforms the compressible member 78b to thereby create a seal. The third door 74 is disposed in a central region of exterior air intake aperture 38 and the second door 72 seals the second interior air intake aperture 40b similar to the position of the second door 72 in the fresh air position described above. As such, air is able to enter the blower unit 30 through both the exterior air intake aperture 38 and the first interior air intake aperture 40a. Then the air flows through the filter 56, through the bellmouth member 34, through the lower case member 36, and out of the blower unit 30 through the exhaust chamber 54.

It will be appreciated that the first door 70 and the sealing member 60 cooperate to prohibit air flow out of the blower unit through the first interior air intake aperture 40a because the first door 70 is sealed against the sealing member 60. In addition, a wall 94 which is a part of bellmouth member 34 also prohibits airflow out of the blower unit through the first interior air intake aperture 40a. In one embodiment, the first door 70, the sealing member 60 and the compressible member 78b prevent substantially all air flow out of the blower unit through the first interior air intake aperture 40a. As such, air is unlikely to leak into the passenger compartment 14 from the exterior space 20 of the vehicle 10 without first being heated or cooled by the HVAC unit 16. This leakage from the exterior space 20 into the passenger compartment 14 can create passenger discomfort such as cold outside air blowing on a passenger's lower body. This, in turn, causes the HVAC unit 16 to work more efficiently and conserve fuel for the vehicle 10.

Figure 8:
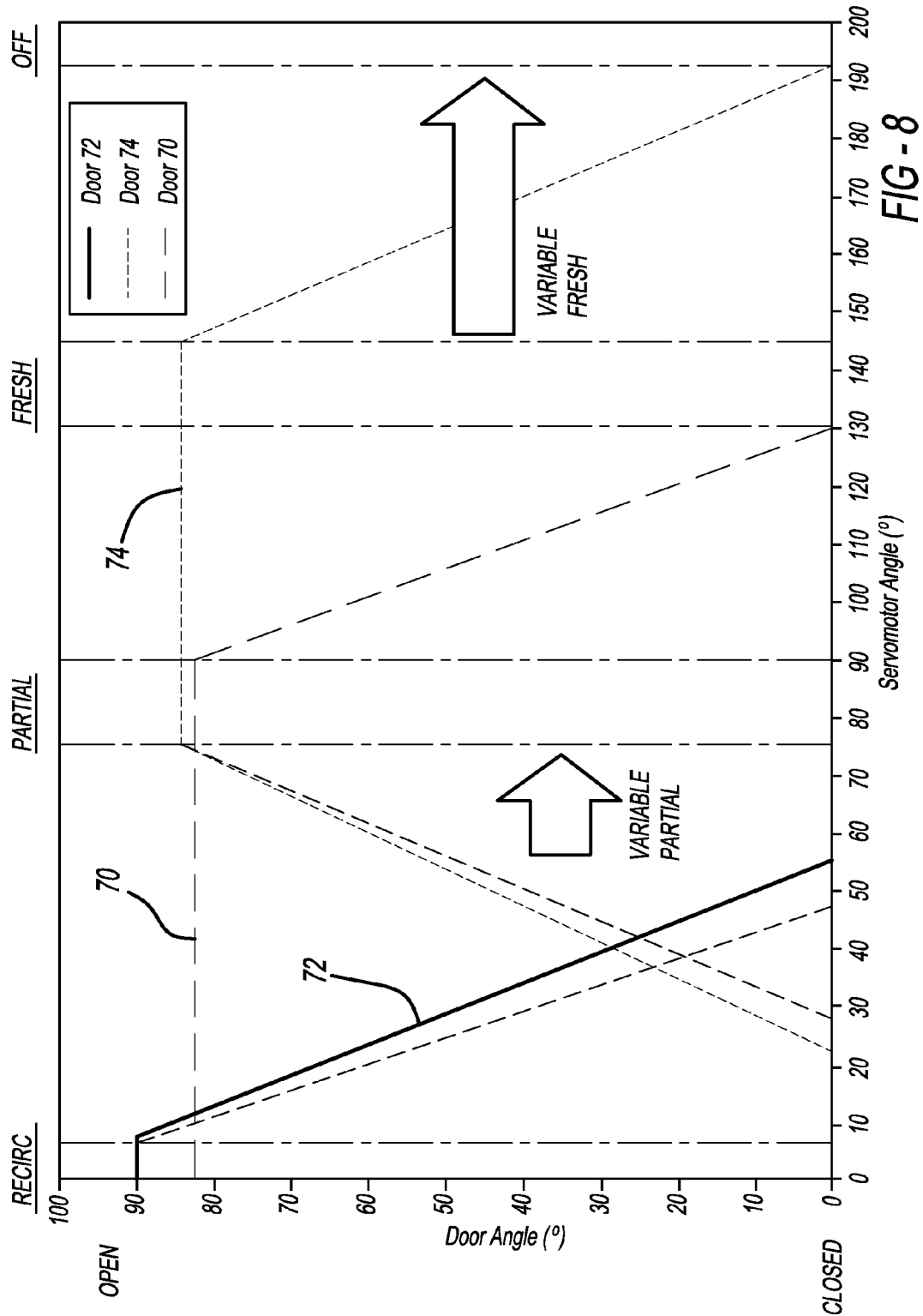
FIG. 8 is a graph showing the movement of the door of the HVAC system in relation to one another.

Referring to FIG. 8, the relationship between the doors 70, 72, 74 is illustrated. The relationship between the position of the three doors 70, 72, 74 is illustrated in relation to the rotational angle of a servomotor (not shown). It is to be understood that the servomotor operates a linkage assembly (not shown) that controls the rotation of the three doors 70, 72, 74. In FIG. 8, the door angle for doors 70, 72, 74 of zero degrees is the condition where the door fully closes the opening and the eighty to ninety degree door angle indicates that the door fully opens the opening. For the door 70, the opening is the first interior air intake aperture 40a, for the door 72, the opening is the second interior air intake aperture 40b and for the door 74, the opening is the exterior air intake aperture 38.

A variable partial mode is defined between the recirculation mode and the partial recirculation mode when the door 72 moves to its closed position, door 70 remains open and the door 74 moves between its closed and open positions. A variable fresh mode is defined between the fresh mode and an off mode when the door 72 remains closed, the door 70 closes and the door 74 moves from its open position to its closed position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating, ventilation and air conditioning system comprising:
   a case defining an exterior air intake aperture, a first interior air intake aperture and a second interior air intake aperture;
   a first door rotatably attached to the case, the first door movable between an open position where the first interior air intake aperture is open and a closed position where the first interior air intake aperture is closed;
   a second door, separate from the first door, rotatably attached to the case, the second door movable between an open position where the second interior air intake aperture is open and a closed position where the second interior air intake aperture is closed; and
   a third door rotatably attached to the case, the third door movable between an open position where the exterior air intake aperture is open and a closed position where the exterior air intake aperture is closed;
   wherein:
      the heating, ventilation and air conditioning system defines a recirculation mode when the first door is in the open position, the second door is in the open position, and the third door is in the closed position;
      the heating, ventilation and air conditioning system defines a fresh mode when the first door is in the closed position, the second door is in the closed position, and the third door is in the open position;
      the heating ventilation and air conditioning system defines a partial recirculation mode when the first door is in the open position, the second door is in the closed position, and the third door is in the open position;
      the heating, ventilation and air conditioning system defines a variable partial mode between the recirculation mode and the partial recirculation mode; and
      the heating, ventilation and air conditioning system defines a variable fresh mode between the fresh mode and an off mode.

2. The heating, ventilation and air conditioning system according to claim 1, wherein the first door blocks airflow from the exterior air intake aperture to the first interior air intake aperture when the first door is in the open position in the partial recirculation mode.

3. The heating, ventilation and air conditioning system according to claim 1, wherein the first door blocks airflow from the exterior air intake aperture to the first interior air intake aperture when the first door is in the closed position.

* * * * *